US010438548B2

(12) United States Patent
Wang

(10) Patent No.: US 10,438,548 B2
(45) Date of Patent: Oct. 8, 2019

(54) DRIVER CIRCUIT STRUCTURE FOR RGBW DISPLAY PANEL INCLUDING DATA LINES EACH OF WHICH CONTROLS SUB-PIXELS OF THE SAME COLOR DURING A TIME THAT A GROUP OF SCAN LINES ARE TURNED ON

(71) Applicant: Wuhan China Star Optoelectronics Technology Co., Ltd., Wuhan (CN)

(72) Inventor: Cong Wang, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 26 days.

(21) Appl. No.: 15/534,003

(22) PCT Filed: Apr. 19, 2017

(86) PCT No.: PCT/CN2017/081028
§ 371 (c)(1),
(2) Date: Jun. 8, 2017

(87) PCT Pub. No.: WO2018/176521
PCT Pub. Date: Oct. 4, 2018

(65) Prior Publication Data

US 2018/0315382 A1 Nov. 1, 2018

(30) Foreign Application Priority Data

Mar. 30, 2017 (CN) .......................... 2017 1 0203245

(51) Int. Cl.
*G06F 3/038* (2013.01)
*G09G 5/00* (2006.01)
(Continued)

(52) U.S. Cl.
CPC ......... *G09G 3/3607* (2013.01); *G09G 3/3225* (2013.01); *G09G 3/3648* (2013.01);
(Continued)

(58) Field of Classification Search
None
See application file for complete search history.

(56) References Cited

U.S. PATENT DOCUMENTS 7,746,335 B2 6/2010 Hsu
2008/0266232 A1* 10/2008 Hsu ...................... G09G 3/3648 345/96
(Continued)

FOREIGN PATENT DOCUMENTS

CN 103137054 A 6/2013
CN 104505041 A 4/2015
(Continued)

*Primary Examiner* — Lunyi Lao
*Assistant Examiner* — Kirk W Hermann
(74) *Attorney, Agent, or Firm* — Leong C. Lei

(57) ABSTRACT

The invention provides a driver circuit structure for RGBW display panel, by arranging the driving TFTs on both sides of the data line to control the corresponding sub-pixels and disposing the plurality of scanning lines into two or four groups for interlaced scanning so that any data line only controlling sub-pixels of the same color during the time a group of scan lines being turned on. As such, the present invention can effectively improve the color shift when displaying solid color screen, improve the display quality, reduce the number of switches of data signal in the data line and reduce energy consumption.

6 Claims, 7 Drawing Sheets

(51) Int. Cl.
*G09G 3/36* (2006.01)
*G09G 3/3225* (2016.01)

(52) U.S. Cl.
CPC ............... *G09G 2300/0426* (2013.01); *G09G 2300/0452* (2013.01); *G09G 2310/021* (2013.01); *G09G 2310/0216* (2013.01); *G09G 2310/0218* (2013.01)

(56) References Cited

U.S. PATENT DOCUMENTS

| | | | | |
|---|---|---|---|---|
| 2010/0110359 | A1* | 5/2010 | Lee ........................ | G02F 1/1345 349/149 |
| 2010/0265272 | A1 | 10/2010 | Bae et al. | |
| 2013/0201174 | A1* | 8/2013 | Pyun .................... | G09G 3/3607 345/213 |
| 2015/0348481 | A1* | 12/2015 | Hong ................... | G09G 3/2003 345/690 |
| 2016/0314736 | A1* | 10/2016 | Sang .................... | G09G 3/3607 |

FOREIGN PATENT DOCUMENTS

| | | | |
|---|---|---|---|
| CN | 105511184 | A | 4/2016 |
| CN | 106057164 | A | 10/2016 |
| CN | 106249489 | A | 12/2016 |
| EP | 2037444 | A1 | 3/2009 |

* cited by examiner

DRIVER CIRCUIT STRUCTURE FOR RGBW DISPLAY PANEL INCLUDING DATA LINES EACH OF WHICH CONTROLS SUB-PIXELS OF THE SAME COLOR DURING A TIME THAT A GROUP OF SCAN LINES ARE TURNED ON

BACKGROUND OF THE INVENTION

1. Field of the Invention

The present invention relates to the field of display, and in particular to a driver circuit structure for RGBW display panel.

2. The Related Arts

Both the liquid crystal display (LCD) and organic light-emitting diode (OLED) display panel comprise a plurality of pixels arranged in an array. The conventional pixels comprise red (R), green (G), and blue (B) sub-pixels. In the known technology, the R, G, B color filters are light-absorbing type. When the light enters, only the light with corresponding color can pass through, and the light of the other two colors are absorbed, resulting in low transmission rate of the display panel. Thus, a display technique is developed wherein four sub-pixels of red, green, blue, and white (W) colors are formed in a pixel, in which no color layer is added for the W sub-pixel. By controlling the corresponding grayscale of the W sub-pixel, the light transmission rate of the display panel is improved. This type of display panel is often referred to as RGBW display panel.

Refer to FIG. 1. The design of known RGBW display panel usually makes two adjacent sub-pixels (left and right) of the same row a square pixel structure P1', and any two adjacent (left and right) pixel structures P1' must comprises a red sub-pixel R, a green sub-pixel G, a blue sub-pixel B, and a white sub-pixel W. For an integer i, the sub-pixels of the i-th and (i+1)-th rows, any two adjacent (upper and lower) pixel structures P1' must comprises a red sub-pixel R, a green sub-pixel G, a blue sub-pixel B, and a white sub-pixel W. Furthermore, for positive integers a, n the a-th data line D(a) is disposed at the left side of the a-th column of sub-pixels, the n-th scan line G(n) is disposed at the top of the n-th row of sub-pixels. The sub-pixel at a-th column and n-th row is electrically connected to the a-th data line D(a) and the n-th scan line G(n) through a corresponding driving TFT T; that is, each data line drives the sub-pixels located at the right side through the corresponding TFT T. This pixel layout can improve the aperture ratio of the pixel and improves the luminance of the panel.

Compared with the conventional RGB panel, any column of the sub-pixels in the RGBW display panel shown in FIG. 1 will have more than one color sub-pixel distribution, for example, the column of sub-pixels controlled by the first data line D(1) comprises the red sub-pixels R, green sub-pixels G, ad blue sub-pixels B.

Refer to FIG. 2. The scan lines start to scan from top down following the order of G(1), G(2), G(3), . . . , G(2n−1), G(2n), wherein VGH indicates high voltage for controlling the driving TFT T to turn on, VGL indicates low voltage for controlling the driving TFT T to turn off. In the driving order shown in FIG. 2, when the known RGBW display panel displays a solid color screen, the data signal output of each data line needs to switch continuously, which is a reloading displaying. Due to the effect of RC delay, the panel is prone to erroneous charging, causing color shift, affecting the display of the panel. Especially in the panel test phase, RC delay is more serious, and the solid color screen is often used as detection screen, likely to cause misjudge, resulting in reduced panel yield.

Refer to FIGS. 1 to 4, taking the case where the conventional RGBW display panel displays a solid green screen as an example. For the first column of sub-pixels controlled by the first data line D(1), when the scanning signal in the first scan line G(1) is turned on, the voltage of the data signal in the first data line D(1) is high so as to charge the green sub-pixel G; when the scanning signal in the second scanning line G(2) is turned on, the voltage of the data signal in the first data line D(1) switches to Com; when the scanning signal in the third scan line G(3) is turned on, the voltage of the data signal in the first data line D(1) rises to high again, and so on. As such, the entire switching process overloads the driving IC. As shown in FIG. 4, due to the RC delay present in the panel, the red sub-pixel R and the blue sub-pixel B below the green sub-pixel G also appear to be erroneously charged. Therefore, when the panel displays a solid green screen, a whitening phenomenon will appears. Similarly, when the panel shows a solid red or solid blue screen, a whitening phenomenon also appears, affecting the quality of the images.

SUMMARY OF THE INVENTION

The object of the present invention is to provide a driver circuit structure for RGBW display panel, able to improve the color shift when displaying solid color screen effectively, improve display quality and reduce energy consumption of the panel.

To achieve the above object, the present invention provides a driver circuit structure for RGBW display panel, comprising:

a plurality of red sub-pixels, green sub-pixels, blue sub-pixels, and white sub-pixels arranged in an array; wherein the two left/right adjacent sub-pixels forming a pixel structure unit, for an odd integer i, for the i-th and (i+1)-th rows of sub-pixels, any two adjacent pixel structure units comprising sub-pixels of red, green, blue, and white colors;

a plurality of scan lines arranged from left to right;

a plurality of data lines arranged from top to bottom;

and a plurality of driving thin film transistors (TFTs), each TFT used for electrically connecting a sub-pixel to corresponding data line and scan line, and the driving TFTs being arranged on two sides of the data lines;

the plurality of scan lines being divided into two or four groups, any data line only controlling sub-pixels of the same color during the time a group of scan lines being turned on.

Optionally, the plurality of scan lines are divided into two groups, wherein the old-numbered scan lines form a first group and the even-numbered scan lines form a second group; after the first group of scan lines finishes, the second group of scan lines is turned on.

According to a preferred embodiment of the present invention, any data line only controls two colors of sub-pixels within a frame time, data signal in any data line switches once each half frame time.

According to a preferred embodiment of the present invention, a data line is disposed correspondingly for a column of sub-pixels, a scan line is disposed correspondingly for a row of sub-pixels, the a-th data line is disposed at the right side of the a-th column of sub-pixels, the b-th scan line is disposed above the b-th row of sub-pixels;

four rows by four columns of sub-pixels are defined as a repetitive array unit, for each repetitive array unit: the sub-pixel at first column, first row is a green sub-pixel, and the corresponding driving TFT is at the left side of the first data line electrically connected to the first data line and the first scan line; the sub-pixel at first column, second row is a red sub-pixel; the sub-pixel at first column, third row is a green sub-pixel, and the corresponding driving TFT is at the left side of the first data line electrically connected to the first data line and the third scan line; the sub-pixel at first column, fourth row is a blue sub-pixel;

the sub-pixel at second column, first row is a blue sub-pixel, and the corresponding driving TFT is at the left side of the second data line electrically connected to the second data line and the first scan line; the sub-pixel at second column, second row is a white sub-pixel, and the corresponding driving TFT is at the right side of the first data line electrically connected to the first data line and the second scan line; the sub-pixel at second column, third row is a red sub-pixel, and the corresponding driving TFT is at the left side of the second data line electrically connected to the second data line and the fourth scan line; the sub-pixel at second column, fourth row is a white sub-pixel, and the corresponding driving TFT is at the right side of the first data line electrically connected to the first data line and the fourth scan line;

the sub-pixel at third column, first row is a red sub-pixel, and the corresponding driving TFT is at the right side of the second data line electrically connected to the second data line and the second scan line; the sub-pixel at third column, second row is a green sub-pixel, and the corresponding driving TFT is at the left side of the third data line electrically connected to the third data line and the second scan line; the sub-pixel at third column, third row is a blue sub-pixel, and the corresponding driving TFT is at the right side of the second data line electrically connected to the second data line and the third scan line; the sub-pixel at third column, fourth row is a green sub-pixel, and the corresponding driving TFT is at the left side of the third data line electrically connected to the third data line and the fourth scan line;

the sub-pixel at fourth column, first row is a white sub-pixel, and the corresponding driving TFT is at the right side of the third data line electrically connected to the third data line and the first scan line; the sub-pixel at fourth column, second row is a blue sub-pixel, and the corresponding driving TFT is at the left side of the fourth data line electrically connected to the fourth data line and the second scan line; the sub-pixel at fourth column, third row is a white sub-pixel, and the corresponding driving TFT is at the right side of the third data line electrically connected to the third data line and the third scan line; the sub-pixel at fourth column, fourth row is a red sub-pixel, and the corresponding driving TFT is at the left side of the fourth data line electrically connected to the fourth data line and the fifth scan line;

for the repetitive array unit at the right side of the fourth data line: the sub-pixel at first column, second row is a red sub-pixel, and the corresponding driving TFT is at the right side of the fourth data line electrically connected to the fourth data line and the third scan line; the sub-pixel at first column, fourth row is a blue sub-pixel, and the corresponding driving TFT is at the right side of the fourth data line electrically connected to the fourth data line and the fourth scan line.

According to a preferred embodiment of the present invention, in the repetitive array unit:

the driving TFTs electrically connected to the first data line and the odd-numbered scan lines correspondingly control all the green sub-pixels at the left side of the first data line; the driving TFTs electrically connected to the first data line and the even-numbered scan lines correspondingly control all the white sub-pixels at the right side of the first data line;

the driving TFTs electrically connected to the second data line and the first scan line correspondingly control all the blue sub-pixels at the left side of the second data line; the driving TFTs electrically connected to the second data line and the third scan line correspondingly control all the blue sub-pixels at the right side of the second data line; the driving TFTs electrically connected to the second data line and the second scan line correspondingly control all the red sub-pixels at the right side of the second data line; the driving TFTs electrically connected to the second data line and the fourth scan line correspondingly control all the red sub-pixels at the left side of the second data line;

the driving TFTs electrically connected to the third data line and the odd-numbered scan lines correspondingly control all the white sub-pixels at the right side of the third data line; the driving TFTs electrically connected to the third data line and the even-numbered scan lines correspondingly control all the green sub-pixels at the left side of the third data line;

the driving TFTs electrically connected to the fourth data line and the third scan line correspondingly control all the red sub-pixels at the right side of the fourth data line; the driving TFTs electrically connected to the fourth data line and the fifth scan line correspondingly control all the red sub-pixels at the left side of the fourth data line; the driving TFTs electrically connected to the fourth data line and the second scan line correspondingly control all the blue sub-pixels at the left side of the fourth data line; the driving TFTs electrically connected to the fourth data line and the fourth scan line correspondingly control all the blue sub-pixels at the right side of the fourth data line.

Optionally, the plurality of scan lines are divided into four groups, wherein the first, fifth, ninth, . . . , (4n−3)-th scan lines form a first group, the second, sixth, tenth, . . . , (4n−2)-th scan lines form a second group, the third, the seventh, the eleventh, . . . , (4n−1)-th scan lines form a third group, and the fourth, eighth, twelfth, . . . , 4n-th scan lines form a fourth group; after the first group of scan lines finishes, the second group of scan lines is turned on; after the second group of scan lines finishes, the third group of scan lines is turned on; after the third group of scan lines finishes, the fourth group of scan lines is turned on.

According to a preferred embodiment of the present invention, any data line only controls one color of sub-pixels within a quarter of frame time, data signal in any data line switches once each quarter of frame time.

According to a preferred embodiment of the present invention, other than a data line is disposed at the left side of the first column of sub-pixels, two adjacent columns of sub-pixels share a data line; two scan lines are disposed correspondingly for a row of sub-pixels, with one above the row and the other below the row respectively;

four rows by four columns of sub-pixels are defined as a repetitive array unit, for each repetitive array unit:

the sub-pixel at first column, first row is a green sub-pixel, and the corresponding driving TFT is at the right side of the first data line electrically connected to the first data line and the first scan line; the sub-pixel at first column, second row is a red sub-pixel, and the corresponding driving TFT is at the right side of the first data line electrically connected to the first data line and the third scan line; the sub-pixel at first column, third row is a green sub-pixel, and the corresponding driving TFT is at the right side of the first data line electrically connected to the first data line and the fifth scan line; the sub-pixel at first column, fourth row is a blue sub-pixel, and the corresponding driving TFT is at the right side of the first data line electrically connected to the first data line and the eighth scan line;

the sub-pixel at second column, first row is a blue sub-pixel, and the corresponding driving TFT is at the left side of the second data line electrically connected to the second data line and the second scan line; the sub-pixel at second column, second row is a white sub-pixel, and the corresponding driving TFT is at the left side of the second data line electrically connected to the second data line and the fourth scan line; the sub-pixel at second column, third row is a red sub-pixel, and the corresponding driving TFT is at the left side of the second data line electrically connected to the second data line and the fifth scan line; the sub-pixel at second column, fourth row is a white sub-pixel, and the corresponding driving TFT is at the left side of the second data line electrically connected to the second data line and the eighth scan line;

the sub-pixel at third column, first row is a red sub-pixel, and the corresponding driving TFT is at the right side of the second data line electrically connected to the second data line and the first scan line; the sub-pixel at third column, second row is a green sub-pixel, and the corresponding driving TFT is at the right side of the second data line electrically connected to the second data line and the third scan line; the sub-pixel at third column, third row is a blue sub-pixel, and the corresponding driving TFT is at the right side of the second data line electrically connected to the second data line and the sixth scan line; the sub-pixel at third column, fourth row is a green sub-pixel, and the corresponding driving TFT is at the right side of the second data line electrically connected to the second data line and the seventh scan line;

the sub-pixel at fourth column, first row is a white sub-pixel, and the corresponding driving TFT is at the left side of the third data line electrically connected to the third data line and the second scan line; the sub-pixel at fourth column, second row is a blue sub-pixel, and the corresponding driving TFT is at the left side of the third data line electrically connected to the third data line and the fourth scan line; the sub-pixel at fourth column, third row is a white sub-pixel, and the corresponding driving TFT is at the left side of the third data line electrically connected to the third data line and the sixth scan line; the sub-pixel at fourth column, fourth row is a red sub-pixel, and the corresponding driving TFT is at the left side of the third data line electrically connected to the third data line and the seventh scan line;

for the repetitive array unit at the right side of the third data line: the sub-pixel at first column, first row is a green sub-pixel, and the corresponding driving TFT is at the right side of the third data line electrically connected to the third data line and the first scan line; the sub-pixel at first column, second row is a red sub-pixel, and the corresponding driving TFT is at the right side of the third data line electrically connected to the third data line and the third scan line; the sub-pixel at first column, third row is a green sub-pixel, and the corresponding driving TFT is at the right side of the third data line electrically connected to the third data line and the fifth scan line; the sub-pixel at first column, fourth row is a blue sub-pixel, and the corresponding driving TFT is at the right side of the third data line electrically connected to the third data line and the eighth scan line.

According to a preferred embodiment of the present invention, for the driving TFTs electrically connected to the second data line: the first scan line turns on to control all the red sub-pixels at the right side of the second data line; the fifth scan line turns on to control all the red sub-pixels at the left side of the second data line; the second scan line turns on to control all the blue sub-pixels at the left side of the second data line; the sixth scan line turns on to control all the blue sub-pixels at the right side of the second data line; the third scan line turns on to control all the green sub-pixels at the right side of the second data line; the seventh scan line turns on to control all the green sub-pixels at the right side of the second data line; the fourth scan line turns on to control all the white sub-pixels at the left side of the second data line; the eighth scan line turns on to control all the white sub-pixels at the left side of the second data line;

for the driving TFTs electrically connected to the third data line: the first scan line turns on to control all the green sub-pixels at the right side of the third data line; the fifth scan line turns on to control all the green sub-pixels at the right side of the third data line; the second scan line turns on to control all the white sub-pixels at the left side of the third data line; the sixth scan line turns on to control all the white sub-pixels at the left side of the third data line; the third scan line turns on to control all the red sub-pixels at the right side of the third data line; the seventh scan line turns on to control all the red sub-pixels at the left side of the third data line; the fourth scan line turns on to control all the blue sub-pixels at the left side of the third data line; the eighth scan line turns on to control all the blue sub-pixels at the right side of the third data line.

The present invention also provides a driver circuit structure for RGBW display panel, comprising:

a plurality of red sub-pixels, green sub-pixels, blue sub-pixels, and white sub-pixels arranged in an array; wherein the two left/right adjacent sub-pixels forming a pixel structure unit, for an odd integer i, for the i-th and (i+1)-th rows of sub-pixels, any two adjacent pixel structure units comprising sub-pixels of red, green, blue, and white colors;

a plurality of scan lines arranged from left to right;

a plurality of data lines arranged from top to bottom;

and a plurality of driving thin film transistors (TFTs), each TFT used for electrically connecting a sub-pixel to corresponding data line and scan line, and the driving TFTs being arranged on two sides of the data lines;

the plurality of scan lines being divided into two or four groups, any data line only controlling sub-pixels of the same color during the time a group of scan lines being turned on; wherein the plurality of scan lines being divided into two groups, wherein the old-numbered scan lines forming a first group and the even-numbered scan lines forming a second group; after the first group of scan lines finishing, the second group of scan lines being turned on;

wherein any data line only controlling two colors of sub-pixels within a frame time, data signal in any data line switching once each half frame time.

Compared to the known techniques, the present invention provides the following advantages: the present invention provides a driver circuit structure for RGBW display panel, by arranging the driving TFTs on both sides of the data line to control the corresponding sub-pixels and disposing the plurality of scanning lines into two or four groups for interlaced scanning so that any data line only controlling sub-pixels of the same color during the time a group of scan lines being turned on. As such, the present invention can effectively improve the color shift when displaying solid color screen, improve the display quality, reduce the number of switches of data signal in the data line and reduce energy consumption.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
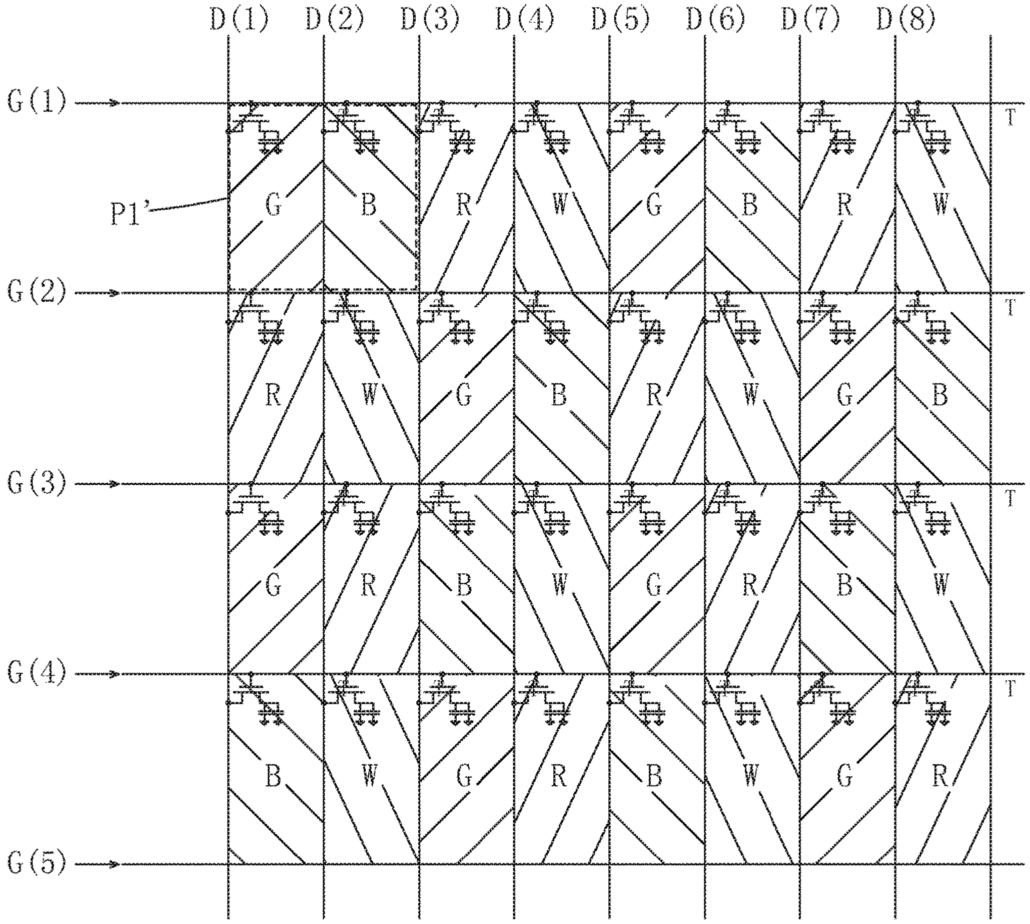
FIG. 1 is a schematic view showing the layout of pixels and circuit in the conventional RGBW display panel.
Figure 2:
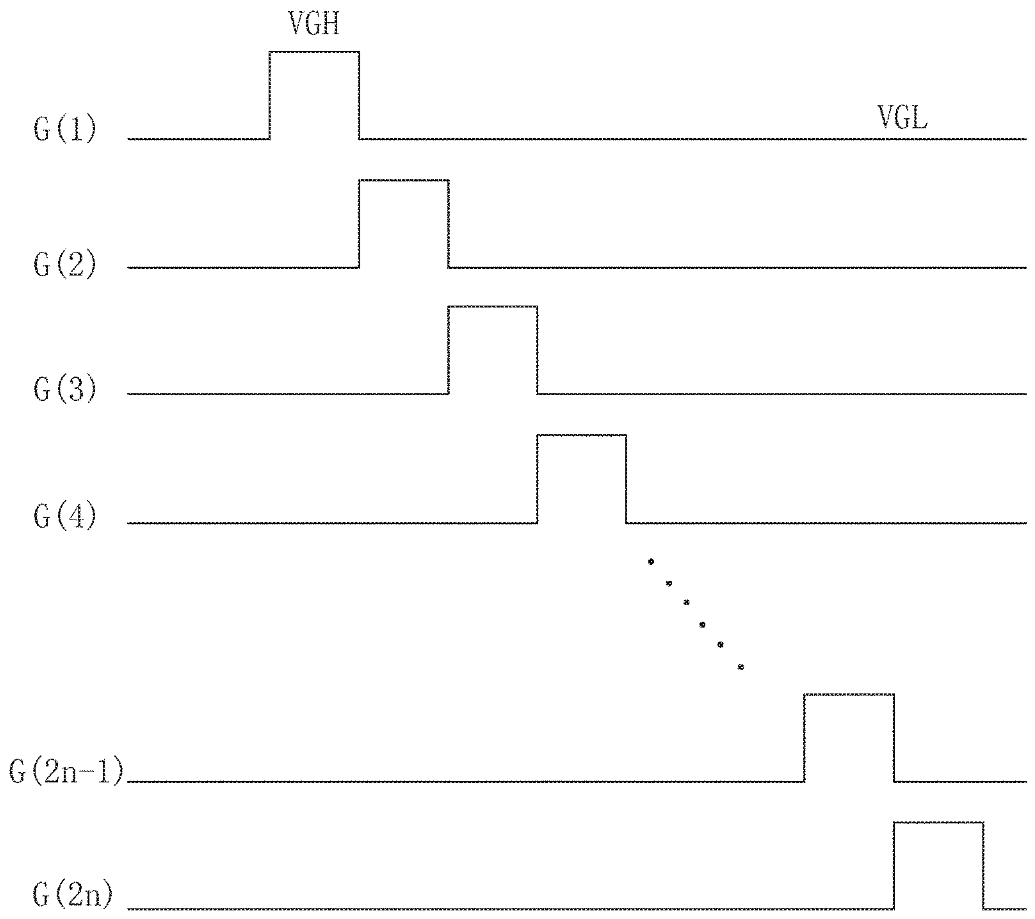
FIG. 2 is a schematic view showing the driving time of the conventional RGBW display panel.
Figure 3:
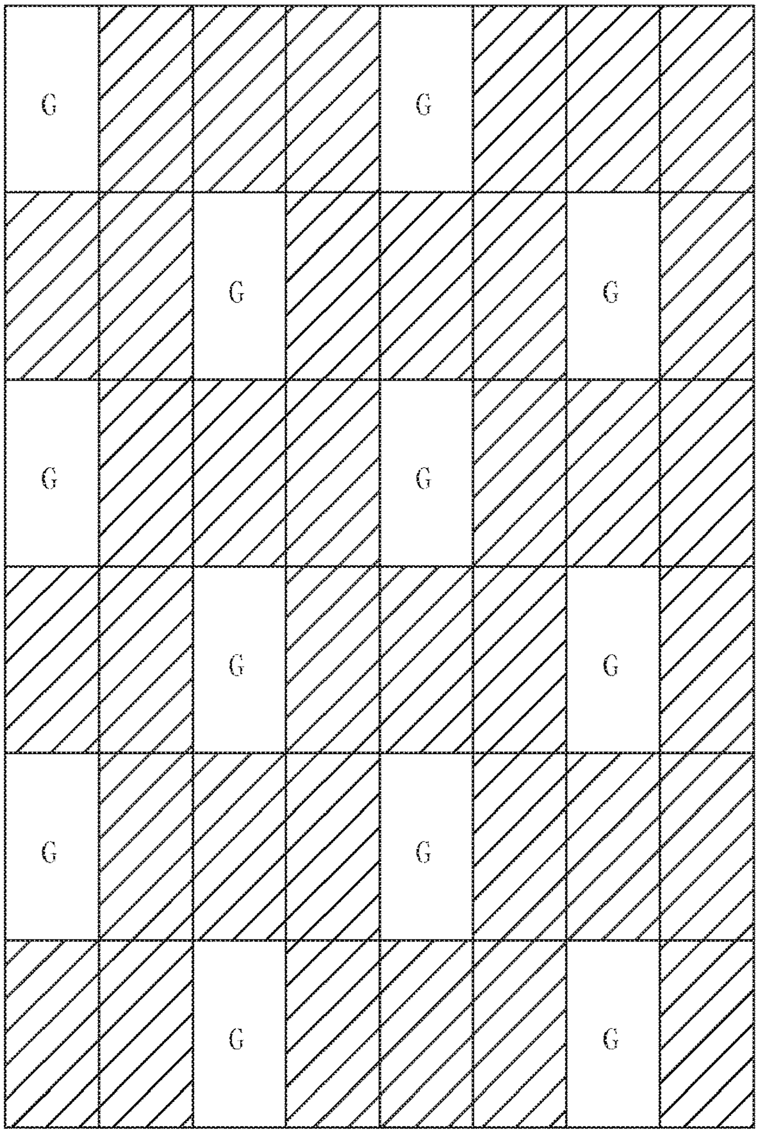
FIG. 3 is a schematic view showing the conventional RGBW display panel displaying a solid green screen.
Figure 4:
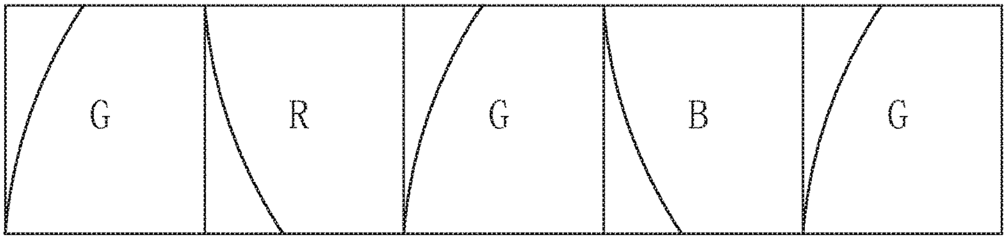
FIG. 4 is a schematic view showing the data signal waveform in the first data line of the conventional RGBW display panel when displaying a solid green screen.
Figure 5:
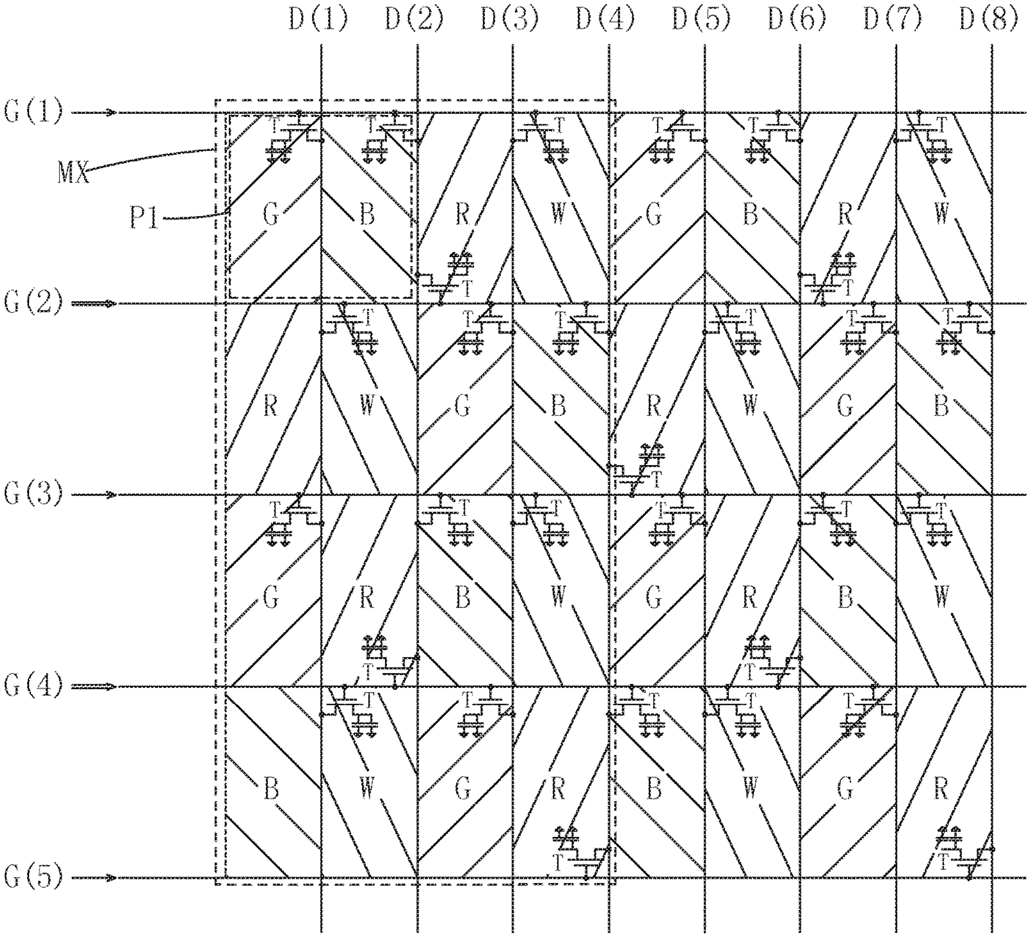
FIG. 5 is a schematic view showing the driver circuit structure in a first embodiment of the RGBW display panel according to the present invention.
Figure 6:
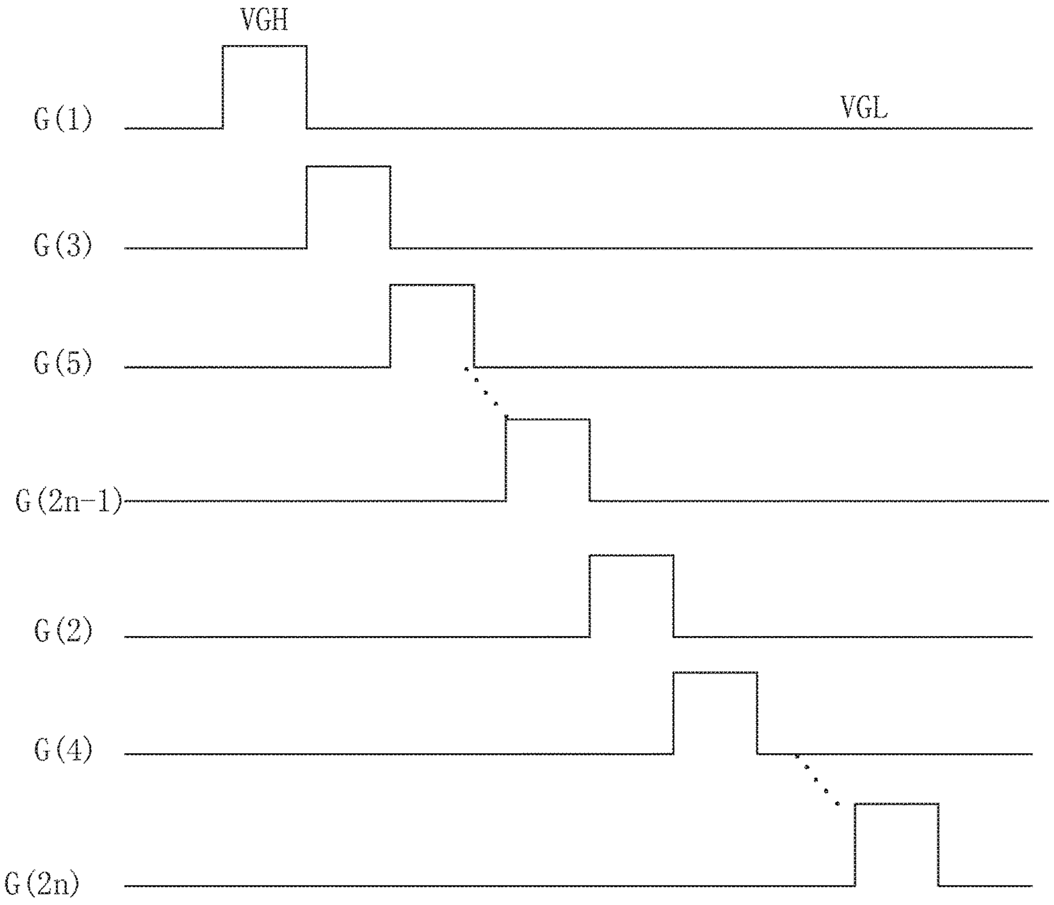
FIG. 6 is a schematic view showing the driving timing for the first embodiment of the RGBW display panel according to the present invention.

The present invention provides a driver circuit structure for RGBW display panel. Refer to FIG. 5 and FIG. 6, showing the first embodiment of the driver circuit structure for RGBW display panel, comprising: a plurality of red sub-pixels R, green sub-pixels G, blue sub-pixels B, and white sub-pixels W arranged in an array; wherein the two left/right adjacent sub-pixels forming a pixel structure unit P1, for an odd integer i, for the i-th and (i+1)-th rows of sub-pixels, any two adjacent pixel structure units P1 comprising sub-pixels of red, green, blue, and white colors;

a plurality of data lines arranged from top to bottom, such as, D(1), D(2), D(3), D(4), D(5), D(6), D(7), D(8), and so on;

a plurality of scan lines arranged from left to right, such as, G(1), G(2), G(3), G(4), G(5), and so on;

and a plurality of driving thin film transistors (TFTs) T, each TFT T used for electrically connecting a sub-pixel to corresponding data line and scan line, and the driving TFTs being arranged on two sides of the data lines.

In the first embodiment, the plurality of scan lines is divided into two groups, wherein the old-numbered scan lines form a first group and the even-numbered scan lines form a second group; after the first group of scan lines finishes, the second group of scan lines is turned on. The scan signal in each scan line is as shown in FIG. 6, wherein VGH indicates high voltage for controlling the driving TFT T to turn on, VGL indicates low voltage for controlling the driving TFT T to turn off.

Specifically:

In the first embodiment, a data line is disposed correspondingly for a column of sub-pixels, a scan line is disposed correspondingly for a row of sub-pixels, the a-th data line is disposed at the right side of the a-th column of sub-pixels, the b-th scan line is disposed above the b-th row of sub-pixels;

four rows by four columns of sub-pixels are defined as a repetitive array unit MX, for each repetitive array unit MX:

the sub-pixel at first column, first row is a green sub-pixel G, and the corresponding driving TFT T is at the left side of the first data line D(1) electrically connected to the first data line D(1) and the first scan line G(1); the sub-pixel at first column, second row is a red sub-pixel R; the sub-pixel at first column, third row is a green sub-pixel G, and the corresponding driving TFT T is at the left side of the first data line D(1) electrically connected to the first data line D(1) and the third scan line G(3); the sub-pixel at first column, fourth row is a blue sub-pixel B;

the sub-pixel at second column, first row is a blue sub-pixel B, and the corresponding driving TFT T is at the left side of the second data line D(2) electrically connected to the second data line D(2) and the first scan line G(1); the sub-pixel at second column, second row is a white sub-pixel W, and the corresponding driving TFT T is at the right side of the first data line D(1) electrically connected to the first data line D(1) and the second scan line G(2); the sub-pixel at second column, third row is a red sub-pixel R, and the corresponding driving TFT T is at the left side of the second data line D(2) electrically connected to the second data line D(2) and the fourth scan line G(4); the sub-pixel at second column, fourth row is a white sub-pixel W, and the corresponding driving TFT T is at the right side of the first data line D(1) electrically connected to the first data line D(1) and the fourth scan line G(4);

the sub-pixel at third column, first row is a red sub-pixel R, and the corresponding driving TFT T is at the right side of the second data line D(2) electrically connected to the second data line D(2) and the second scan line G(2); the sub-pixel at third column, second row is a green sub-pixel G, and the corresponding driving TFT T is at the left side of the third data line D(3) electrically connected to the third data line D(3) and the second scan line G(2); the sub-pixel at third column, third row is a blue sub-pixel B, and the corresponding driving TFT T is at the right side of the second data line D(2) electrically connected to the second data line D(2) and the third scan line G(3); the sub-pixel at third column, fourth row is a green sub-pixel G, and the corresponding driving TFT T is at the left side of the third data line D(3) electrically connected to the third data line D(3) and the fourth scan line G(4);

the sub-pixel at fourth column, first row is a white sub-pixel W, and the corresponding driving TFT T is at the right side of the third data line D(3) electrically connected to the third data line D(3) and the first scan line G(1); the sub-pixel at fourth column, second row is a blue sub-pixel B, and the corresponding driving TFT T is at the left side of the fourth data line D(4) electrically connected to the fourth data line D(4) and the second scan line G(2); the sub-pixel at fourth column, third row is a white sub-pixel W, and the corresponding driving TFT T is at the right side of the third data line D(3) electrically connected to the third data line D(3) and the third scan line G(3); the sub-pixel at fourth column, fourth row is a red sub-pixel R, and the corresponding driving TFT T is at the left side of the fourth data line D(4) electrically connected to the fourth data line D(4) and the fifth scan line G(5);

for the repetitive array unit MX at the right side of the fourth data line D(4): the sub-pixel at first column, second row is a red sub-pixel R, and the corresponding driving TFT T is at the right side of the fourth data line D(4) electrically connected to the fourth data line D(4) and the third scan line G(3); the sub-pixel at first column, fourth row is a blue sub-pixel B, and the corresponding driving TFT T is at the right side of the fourth data line D(4) electrically connected to the fourth data line D(4) and the fourth scan line G(4).

In the repetitive array unit MX: the driving TFTs T electrically connected to the first data line D(1) and the odd-numbered scan lines correspondingly control all the green sub-pixels G at the left side of the first data line D(1); the driving TFTs T electrically connected to the first data line D(1) and the even-numbered scan lines correspondingly control all the white sub-pixels W at the right side of the first data line D(1);

the driving TFTs T electrically connected to the second data line D(2) and the first scan line G(1) correspondingly control all the blue sub-pixels B at the left side of the second data line D(2); the driving TFTs T electrically connected to the second data line D(2) and the third scan line G(3) correspondingly control all the blue sub-pixels B at the right side of the second data line D(2); the driving TFTs T electrically connected to the second data line D(2) and the second scan line G(2) correspondingly control all the red sub-pixels R at the right side of the second data line D(2); the driving TFTs T electrically connected to the second data line D(2) and the fourth scan line G(4) correspondingly control all the red sub-pixels R at the left side of the second data line D(2);

the driving TFTs T electrically connected to the third data line D(3) and the odd-numbered scan lines correspondingly control all the white sub-pixels W at the right side of the third data line D(3); the driving TFTs T electrically connected to the third data line D(3) and the even-numbered scan lines correspondingly control all the green sub-pixels G at the left side of the third data line D(3);

the driving TFTs T electrically connected to the fourth data line D(4) and the third scan line G(3) correspondingly control all the red sub-pixels R at the right side of the fourth data line D(4); the driving TFTs T electrically connected to the fourth data line D(4) and the fifth scan line G(5) correspondingly control all the red sub-pixels R at the left side of the fourth data line D(4); the driving TFTs T electrically connected to the fourth data line D(4) and the second scan line G(2) correspondingly control all the blue sub-pixels B at the left side of the fourth data line D(4); the driving TFTs T electrically connected to the fourth data line D(4) and the fourth scan line G(4) correspondingly control all the blue sub-pixels B at the right side of the fourth data line D(4).

Figure 7:
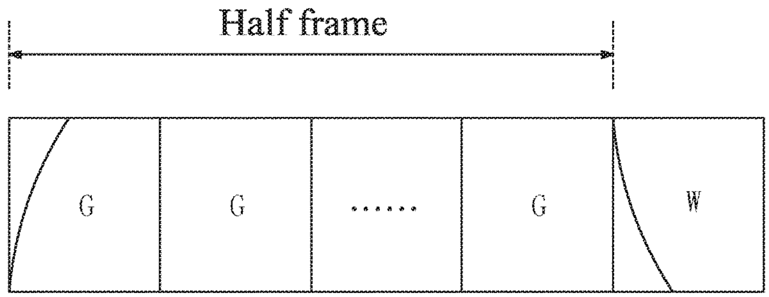
FIG. 7 is a schematic view showing the data signal waveform in the first data line for the first embodiment of the RGBW display panel when displaying a solid green screen according to the present invention.

Refer to FIGS. 5, 6, 7. For an positive integer n, the driving timing sequence of the panel is: first, the first group of odd-numbered scan lines G(1), G(3), G(5), . . . , G(2n−1) are turned on line by line; and then, the second group of odd-numbered scan lines G(2), G(4), G(6), . . . , G(2n) are turned on line by line. In the layout of FIG. 5, any data line only controls one color of sub-pixels during the time the first group of scan lines is turned on, and controls another color of sub-pixels during the time the second group of scan lines is turned on. For example, the first data line only controls the green sub-pixels G during the time the first group of scan lines is turned on, and controls white sub-pixels W during the time the second group of scan lines is turned on; the second data line only controls the blue sub-pixels B during the time the first group of scan lines is turned on, and controls red sub-pixels R during the time the second group of scan lines is turned on. In other words, any data line only controls two colors of sub-pixels in a frame time, and the data signal in any data line switches only once every half frame time. In a frame time, the data signal only switches twice. Compared to the known technology, the present invention not only reduces the overall difference in charging different colors of sub-pixels, improves color shift in solid screen and improve display quality, but also greatly reduces the number of data signal switches in the data line and reduces energy consumption of the panel.

Similarly, take the first data line D(1) when displaying a solid green screen as example. FIG. 7 shows the data signal waveform. In half frame time, the first group of scan lines are turned on one by one, and the data signal in the first data line D(1) charges all the odd-numbered green sub-pixels G; in the second half frame time, the second group of scan lines are turned on one by one, and the data signal in the first data line D(1) switches to common voltage and charges all the even-numbered white sub-pixels W. As such, the color shift is greatly reduced.

Figure 8:
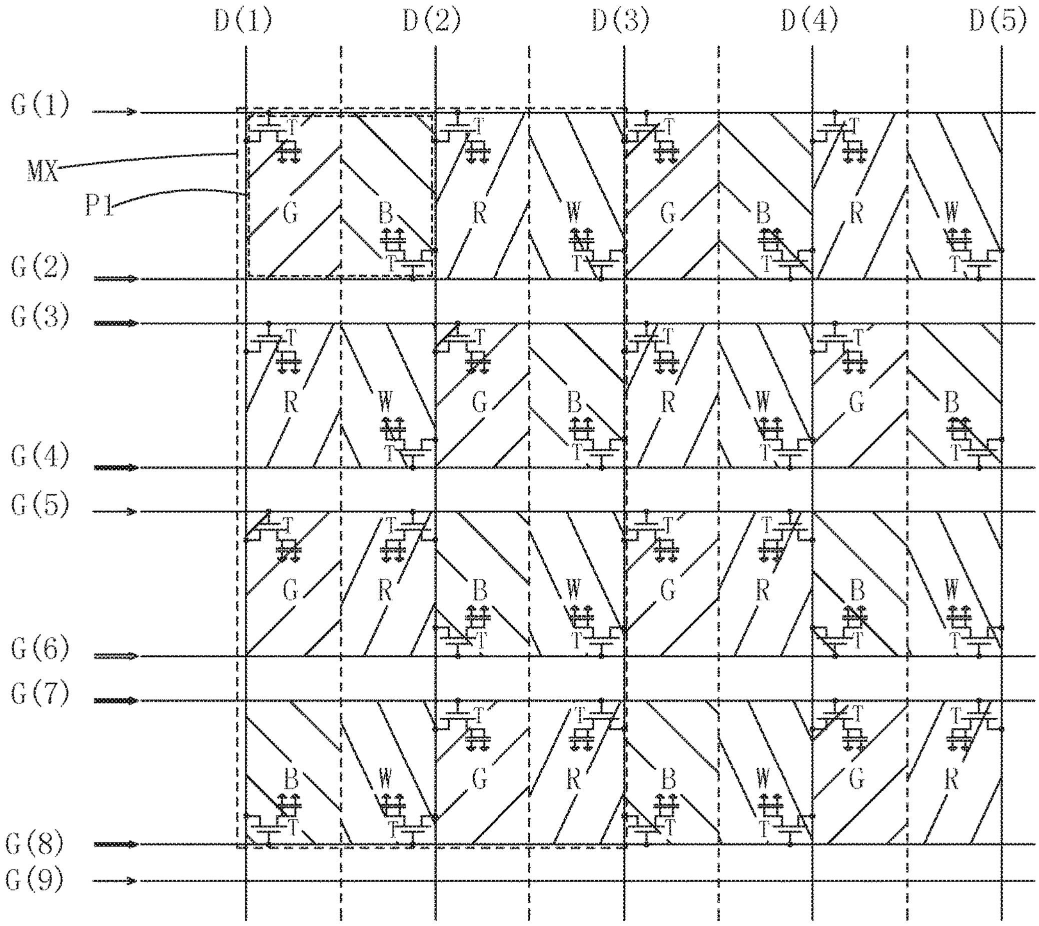
FIG. 8 is a schematic view showing the driver circuit structure in a second embodiment of the RGBW display panel according to the present invention.
Figure 9:
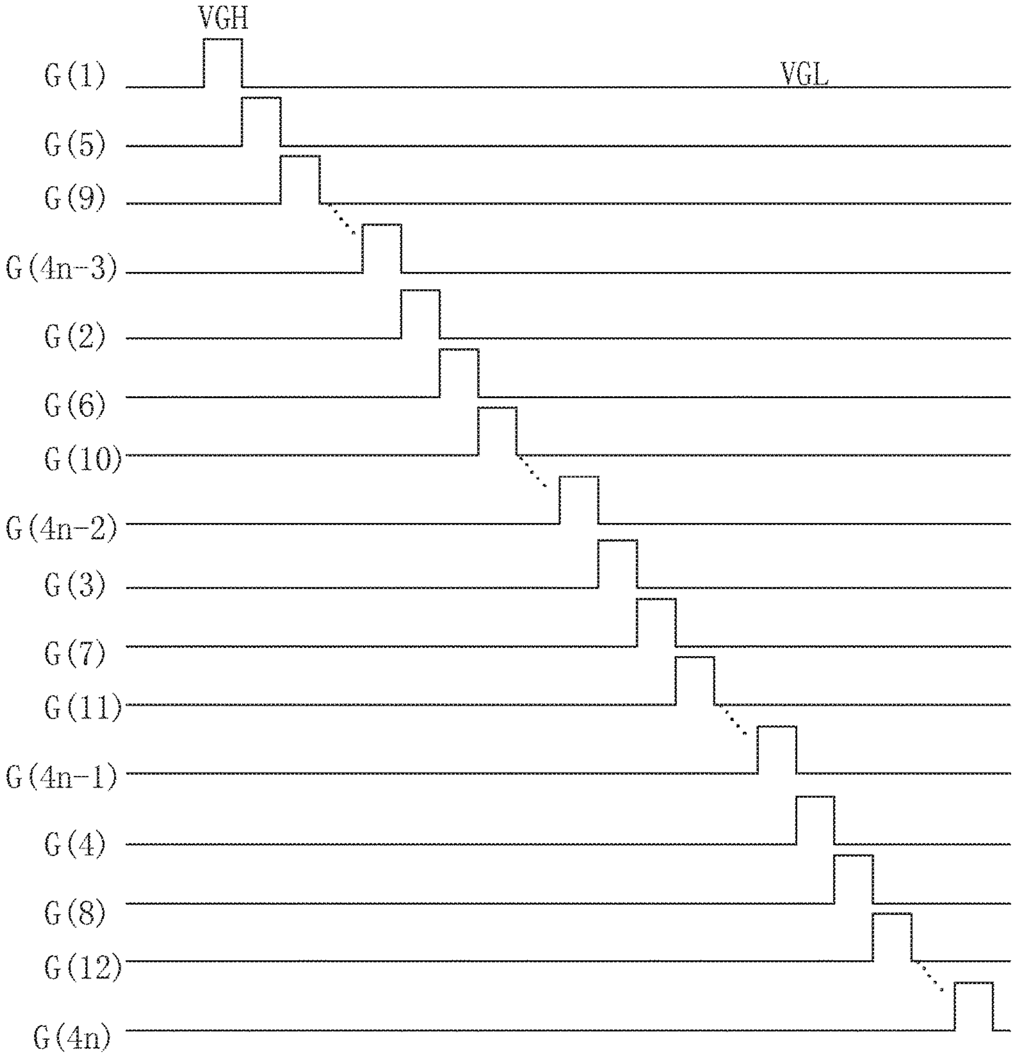
FIG. 9 is a schematic view showing the driving timing for the second embodiment of the RGBW display panel according to the present invention.

Refer to FIG. 8 and FIG. 9 for the second embodiment of the driver circuit structure for RGBW display panel of the present invention. The second embodiment differs from the first embodiment in:

other than the first data line D(1) is disposed at the left side of the first column of sub-pixels, two adjacent columns of sub-pixels share a data line, for example, the second and third columns of sub-pixels share the second data line D(2), and the fourth and fifth columns of sub-pixels share the third data line D(3); two scan lines are disposed correspondingly for a row of sub-pixels, with one above the row and the other below the row respectively, for example, the first scan line G(1) and the second scan line G(2) are disposed respectively above and below the first row of sub-pixels; the third scan line G(3) and the fourth scan line G(4) are disposed respectively above and below the second row of sub-pixels; the fifth scan line G(5) and the sixth scan line G(6) are disposed respectively above and below the third row of sub-pixels; the seventh scan line G(7) and the eighth scan line G(8) are disposed respectively above and below the fourth row of sub-pixels;

the plurality of scan lines are divided into four groups, wherein the first G(1), fifth G(5), ninth G(9), . . . , (4n−3)-th scan lines G(4n−3) form a first group, the second G(2), sixth G(6), tenth G(10), . . . , (4n−2)-th scan lines G(4n−2) form a second group, the third G(3), the seventh G(7), the eleventh G(11), . . . , (4n−1)-th scan lines G(4n−1) form a third group, and the fourth G(4), eighth G(8), twelfth G(12), . . . , 4n-th scan lines G(4n) form a fourth group; after the first group of scan lines finishes, the second group of scan lines is turned on; after the second group of scan lines finishes, the third group of scan lines is turned on; after the third group of scan lines finishes, the fourth group of scan lines is turned on.

Specifically:

four rows by four columns of sub-pixels are defined as a repetitive array unit MX, for each repetitive array unit MX:

the sub-pixel at first column, first row is a green sub-pixel G, and the corresponding driving TFT T is at the right side of the first data line D(1) electrically connected to the first data line D(1) and the first scan line G(1); the sub-pixel at first column, second row is a red sub-pixel R, and the corresponding driving TFT T is at the right side of the first data line D(1) electrically connected to the first data line D(1) and the third scan line G(3); the sub-pixel at first column, third row is a green sub-pixel G, and the corresponding driving TFT T is at the right side of the first data line D(1) electrically connected to the first data line D(1) and the fifth scan line G(5); the sub-pixel at first column, fourth row is a blue sub-pixel B, and the corresponding driving TFT T is at the right side of the first data line D(1) electrically connected to the first data line D(1) and the eighth scan line G(8);

the sub-pixel at second column, first row is a blue sub-pixel B, and the corresponding driving TFT T is at the left side of the second data line D(2) electrically connected to the second data line D(2) and the second scan line G(2); the sub-pixel at second column, second row is a white sub-pixel W, and the corresponding driving TFT T is at the left side of the second data line D(2) electrically connected to the second data line D(2) and the fourth scan line G(4); the sub-pixel at second column, third row is a red sub-pixel R, and the corresponding driving TFT T is at the left side of the second data line D(2) electrically connected to the second data line D(2) and the fifth scan line G(5); the sub-pixel at second column, fourth row is a white sub-pixel W, and the corresponding driving TFT T is at the left side of the second data line D(2) electrically connected to the second data line D(2) and the eighth scan line G(8);

the sub-pixel at third column, first row is a red sub-pixel R, and the corresponding driving TFT T is at the right side of the second data line D(2) electrically connected to the second data line D(2) and the first scan line G(1); the sub-pixel at third column, second row is a green sub-pixel G, and the corresponding driving TFT T is at the right side of the second data line D(2) electrically connected to the second data line D(2) and the third scan line G(3); the sub-pixel at third column, third row is a blue sub-pixel B, and the corresponding driving TFT T is at the right side of the second data line D(2) electrically connected to the second data line D(2) and the sixth scan line G(6); the sub-pixel at third column, fourth row is a green sub-pixel G, and the corresponding driving TFT T is at the right side of the second data line D(2) electrically connected to the second data line D(2) and the seventh scan line G(7);

the sub-pixel at fourth column, first row is a white sub-pixel W, and the corresponding driving TFT T is at the left side of the third data line D(3) electrically connected to the third data line D(3) and the second scan line G(2); the sub-pixel at fourth column, second row is a blue sub-pixel B, and the corresponding driving TFT T is at the left side of the third data line D(3) electrically connected to the third data line D(3) and the fourth scan line G(4); the sub-pixel at fourth column, third row is a white sub-pixel W, and the corresponding driving TFT T is at the left side of the third data line D(3) electrically connected to the third data line D(3) and the sixth scan line G(6); the sub-pixel at fourth column, fourth row is a red sub-pixel R, and the corresponding driving TFT T is at the left side of the third data line D(3) electrically connected to the third data line D(3) and the seventh scan line G(7);

for the repetitive array unit MX at the right side of the third data line D(3): the sub-pixel at first column, first row is a green sub-pixel G, and the corresponding driving TFT T is at the right side of the third data line D(3) electrically connected to the third data line D(3) and the first scan line G(1); the sub-pixel at first column, second row is a red sub-pixel R, and the corresponding driving TFT T is at the right side of the third data line D(3) electrically connected to the third data line D(3) and the third scan line G(3); the sub-pixel at first column, third row is a green sub-pixel G, and the corresponding driving TFT T is at the right side of the third data line D(3) electrically connected to the third data line D(3) and the fifth scan line G(5); the sub-pixel at first column, fourth row is a blue sub-pixel B, and the corresponding driving TFT T is at the right side of the third data line D(3) electrically connected to the third data line D(3) and the eighth scan line G(8).

For the driving TFTs T electrically connected to the second data line D(2): the first scan line G(1) turns on to control all the red sub-pixels R at the right side of the second data line D(2); the fifth scan line G(5) turns on to control all the red sub-pixels R at the left side of the second data line D(2); the second scan line G(2) turns on to control all the blue sub-pixels B at the left side of the second data line D(2); the sixth scan line G(6) turns on to control all the blue sub-pixels B at the right side of the second data line D(2); the third scan line G(3) turns on to control all the green sub-pixels G at the right side of the second data line D(2); the seventh scan line G(7) turns on to control all the green sub-pixels G at the right side of the second data line D(2); the fourth scan line G(4) turns on to control all the white sub-pixels W at the left side of the second data line D(2); the eighth scan line G(8) turns on to control all the white sub-pixels W at the left side of the second data line D(2);

for the driving TFTs T electrically connected to the third data line D(3): the first scan line G(1) turns on to control all the green sub-pixels G at the right side of the third data line D(3); the fifth scan line G(5) turns on to control all the green sub-pixels G at the right side of the third data line D(3); the second scan line G(2) turns on to control all the white sub-pixels W at the left side of the third data line D(3); the sixth scan line G(6) turns on to control all the white sub-pixels W at the left side of the third data line D(3); the third scan line G(3) turns on to control all the red sub-pixels R at the right side of the third data line D(3); the seventh scan line G(7) turns on to control all the red sub-pixels R at the left side of the third data line D(3); the fourth scan line G(4) turns on to control all the blue sub-pixels B at the left side of the third data line D(3); the eighth scan line G(8) turns on to control all the blue sub-pixels B at the right side of the third data line D(3).

Refer to FIG. 9. Fin the second embodiment, the driving timing sequence of the panel is: first, the first group of scan lines G(1), G(5), G(9), . . . , G(4n−3) are turned on line by line; hen, the second group of scan lines G(2), G(6), G(10), . . . , G(4n−2) are turned on line by line; followed by the third group of scan lines G(3), G(7), G(11), . . . , G(4n−1) are turned on line by line; and finally, the fourth group of scan lines G(4), G(8), G(12), . . . , G(4n) are turned on line by line. In the layout of FIG. 8, any data line only controls one color of sub-pixels during the time the first group of scan lines is turned on. For example, the second data line only controls the red sub-pixels R during the time the first group of scan lines is turned on, controls blue sub-pixels B during the time the second group of scan lines is turned on, controls green sub-pixels G during the time the third group of scan lines is turned on, and controls white sub-pixels W during the time the fourth group of scan lines is turned on; the third data line only controls the green sub-pixels G during the time the first group of scan lines is turned on, controls white sub-pixels W during the time the second group of scan lines is turned on, controls red sub-pixels R during the time the third group of scan lines is turned on, and controls blue sub-pixels B during the time the fourth group of scan lines is turned on. In other words, any data line only controls one color of sub-pixels in a quarter of frame time, and the data signal in any data line switches only once every quarter of frame time. In a frame time, the data signal only switches four times. Compared to the known technology, the present invention not only reduces the overall difference in charging different colors of sub-pixels, improves color shift in solid screen and improve display quality, but also greatly reduces the number of data signal switches in the data line and reduces energy consumption of the panel.

In summary, the present invention provides a driver circuit structure for RGBW display panel, by arranging the driving TFTs on both sides of the data line to control the corresponding sub-pixels and disposing the plurality of scanning lines into two or four groups for interlaced scanning so that any data line only controlling sub-pixels of the same color during the time a group of scan lines being turned on. As such, the present invention can effectively improve the color shift when displaying solid color screen, improve the display quality, reduce the number of switches of data signal in the data line and reduce energy consumption.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A g driver circuit structure for RGBW display panel, comprising:

a plurality of red sub-pixels, green sub-pixels, blue sub-pixels, and white sub-pixels arranged in an array; wherein two left/right adjacent sub-pixels forming a pixel structure unit, wherein for an odd integer i, for an i-th row and an (i+1)-th rows of the sub-pixels, any two adjacent pixel structure units comprising one each of the red sub-pixels, the green sub-pixels, the blue sub-pixels, and the white sub-pixels;

a plurality of scan lines arranged from left to right;

a plurality of data lines arranged from top to bottom; and a plurality of driving thin film transistors (TFTs), each of the driving TFTs used for electrically connecting one of the sub-pixels to corresponding ones of the data lines and the scan lines, and the driving TFTs being arranged on two sides of the data lines;

the plurality of scan lines being divided into two or four groups, any of the data lines only controlling ones of the sub-pixels that have a same color during a time a group of the scan lines is turned on;

wherein the two or four groups of the plurality of scan lines are four groups, wherein a first, a fifth, a ninth, . . . , and a (4n−3)-th scan lines form a first one of the four groups, a second, a sixth, a tenth, . . . , and a (4n−2)-th scan lines form a second one of the four groups, a third, a seventh, an eleventh, . . . , and a (4n−1)-th scan lines form a third one of the four groups, and a fourth, an eighth, a twelfth, . . . , and a 4n-th scan lines form a fourth one of the four groups; after the first group of scan lines finishes, the second group of scan lines is turned on; after the second group of scan lines finishes, the third group of scan lines is turned on; after the third group of scan lines finishes, the fourth group of scan lines is turned on.

2. The driver circuit structure for RGBW display panel as claimed in claim 1, wherein any one of the data lines only controls ones of the sub-pixels having one of the red, green, blue, and white colors within each of quarters of frame time, and a data signal in any one of the data lines switches once each of the quarters of frame time.

3. The driver circuit structure for RGBW display panel as claimed in claim 2, wherein other than one of the data lines that is disposed at a left side of a first column of the sub-pixels, two adjacent columns of the sub-pixels share one of the data lines; two of the scan lines are disposed correspondingly for a row of the sub-pixels, with one of the two of the scan line located above the row of the sub-pixels and the other of the two of the scan line located below the row of the sub-pixels;

four rows by four columns of sub-pixels are defined as a repetitive array unit, for each repetitive array unit:

one of the sub-pixels at a first column and a first row is one of the green sub-pixels, and one of the driving TFTs corresponding to the one of the sub-pixels is at a right side of a first data line and electrically connected to the first data line and a first scan line; one of the sub-pixels at the first column and a second row is one of the red sub-pixels, and one of the driving TFTs corresponding to the one of the sub-pixels is at the right side of the first data line and electrically connected to the first data line and a third scan line; one of the sub-pixels at the first column and a third row is one of the green-sub-pixels, and one of the driving TFTs corresponding to the one of the sub-pixels is at the right side of the first data line and electrically connected to the first data line and a fifth scan line; one of the sub-pixels at the first column and a fourth row is one of the blue sub-pixels, and one of the driving TFTs corresponding to the one of the sub-pixels is at the right side of the first data line and electrically connected to the first data line and an eighth scan line;

one of the sub-pixels at a second column and the first row is one of the blue sub-pixels, and one of the driving TFTs corresponding to the one of the sub-pixels is at a left side of a second data line and electrically connected to the second data line and a second scan line; one of the sub-pixels at the second column and the second row is one of the white sub-pixels, and one of the driving TFTs corresponding to the one of the sub-pixels is at the left side of the second data line and electrically connected to the second data line and a fourth scan line; one of the sub-pixels at the second column and the third row is one of the red sub-pixels, and one of the driving TFTs corresponding to the one of the sub-pixels is at the left side of the second data line and electrically connected to the second data line and the fifth scan line; one of the sub-pixels at the second column and the fourth row is one of the white sub-pixels, and one of the driving TFTs corresponding to the one of the sub-pixels is at the left side of the second data line and electrically connected to the second data line and the eighth scan line;

one of the sub-pixels at a third column and the first row is one of the red sub-pixels, and one of the driving TFTs corresponding to the one of the sub-pixels is at a right side of the second data line and electrically connected to the second data line and the first scan line; one of the sub-pixels at the third column and the second row is one of the green sub-pixels, and one of the driving TFTs corresponding to the one of the sub-pixels is at the right side of the second data line and electrically connected to the second data line and the third scan line; one of the sub-pixels at the third column and the third row is one of the blue-sub-pixels, and one of the driving TFTs corresponding to the one of the sub-pixels is at the right side of the second data line and electrically connected to the second data line and a sixth scan line; one of the sub-pixels at the third column and fourth row is one of the green sub-pixels, and one of the driving TFTs corresponding to the one of the sub-pixels is at the right side of the second data line and electrically connected to the second data line and a seventh scan line;

one of the sub-pixels at a fourth column and the first row is one of the white sub-pixels, and one of the driving TFTs corresponding to the one of the sub-pixels is at a left side of the third data line and electrically connected to the third data line and the second scan line; one of the sub-pixels at the fourth column and second row is one of the blue sub-pixels, and one of the driving TFTs corresponding to the one of the sub-pixels is at the left side of the third data line and electrically connected to the third data line and the fourth scan line; one of the sub-pixels at the fourth column and third row is one of the white-sub-pixels, and one of the driving TFTs corresponding to the one of the sub-pixels is at the left side of the third data line and electrically connected to the third data line and the sixth scan line; one of the sub-pixels at the fourth column and fourth row is one of the red-sub-pixels, and one of the driving TFTs corresponding to the one of the sub-pixels is at the left side of the third data line and electrically connected to the third data line and the seventh scan line;

for a repetitive array unit at a right side of the third data line: one of the sub-pixels at a first column and a first row is one of the green sub-pixels, and one of the driving TFTs corresponding to the one of the sub-pixels is at the right side of the third data line and electrically connected to the third data line and the first scan line; one of the sub-pixels at the first column a second row is one of the red sub-pixels, and one of the driving TFTs corresponding to the one of the sub-pixels is at the right side of the third data line and electrically connected to the third data line and the third scan line; one of the sub-pixels at the first column a third row is one of the green sub-pixels, and one of the driving TFTs corresponding to the one of the sub-pixels is at the right side of the third data line and electrically connected to the third data line and the fifth scan line; one of the sub-pixels at the first column a fourth row is one of the blue sub-pixels, and one of the driving TFTs corresponding to the one of the sub-pixels is at the right side of the third data line and electrically connected to the third data line and the eighth scan line.

4. The driver circuit structure for RGBW display panel as claimed in claim 3, wherein for ones of the driving TFTs that are electrically connected to a second data line: a first scan line turns on to control all the red sub-pixels at a right side of the second data line; a fifth scan line turns on to control all the red sub-pixels at a left side of the second data line; a second scan line turns on to control all the blue sub-pixels at the left side of the second data line; a sixth scan line turns on to control all the blue sub-pixels at the right side of the second data line; a third scan line turns on to control all the green sub-pixels at the right side of the second data line; a seventh scan line turns on to control all the green sub-pixels at the right side of the second data line; a fourth scan line turns on to control all the white sub-pixels at the left side of the second data line; an eighth scan line turns on to control all the white sub-pixels at the left side of the second data line;

for ones of the driving TFTs that are electrically connected to a third data line: a first scan line turns on to control all the green sub-pixels at a right side of the third data line; a fifth scan line turns on to control all the green sub-pixels at the right side of the third data line; a second scan line turns on to control all the white sub-pixels at a left side of the third data line; a sixth scan line turns on to control all the white sub-pixels at the left side of the third data line; a third scan line turns on to control all the red sub-pixels at the right side of the third data line; a seventh scan line turns on to control all the red sub-pixels at the left side of the third data line; a fourth scan line turns on to control all the blue sub-pixels at the left side of the third data line; an eighth scan line turns on to control all the blue sub-pixels at the right side of the third data line.

5. A driver circuit structure for RGBW display panel, comprising:

a plurality of red sub-pixels, green sub-pixels, blue sub-pixels, and white sub-pixels arranged in an array; wherein two left/right adjacent sub-pixels forming a pixel structure unit, wherein for an odd integer i, for an i-th row and an (i+1)-th rows of the sub-pixels, any two adjacent pixel structure units comprising one each of the red sub-pixels, the green sub-pixels, the blue sub-pixels, and the white sub-pixels;

a plurality of scan lines arranged from left to right;

a plurality of data lines arranged from top to bottom; and a plurality of driving thin film transistors (TFTs), each of the driving TFTs used for electrically connecting one of the sub-pixels to corresponding ones of the data lines and the scan lines, and the driving TFTs being arranged on two sides of the data lines;

the plurality of scan lines being divided into two or four groups, any of the data lines only controlling ones of the sub-pixels that have a same color during a time a group of the scan lines is turned on;

wherein the two or four groups of the plurality of scan lines are two groups, wherein the odd-numbered scan lines forming a first group of the two groups and the even-numbered scan lines forming a second group of the two groups; after the first group of scan lines finishes, the second group of scan lines is turned on;

wherein any of the data lines only controls ones of the sub-pixels that have two of the red, green, blue, and white colors within a frame time, a data signal in any one of the data lines switches once each of halves of frame time;

wherein one of the data lines is disposed correspondingly for each of columns of the sub-pixels and one of the scan lines is disposed correspondingly for each of rows of the sub-pixels; an a-th data line is disposed at a right side of an a-th column of the sub-pixels and a b-th scan line is disposed above a b-th row of the sub-pixels;

four rows by four columns of sub-pixels are defined as a repetitive array unit, for each repetitive array unit:

one of the sub-pixels at a first column and a first row is one of the green sub-pixels, and one of the driving TFTs corresponding to the one of the sub-pixels is at a left side of a first data line and electrically connected to the first data line and a first scan line; one of the sub-pixels at the first column and a second row is one of the red sub-pixels; one of the sub-pixels at the first column and a third row is one of the green sub-pixels, and one of the driving TFTs corresponding to the one of the sub-pixels is at the left side of the first data line and electrically connected to the first data line and a third scan line; one of the sub-pixels at the first column and fourth row is one of the blue sub-pixels;

one of the sub-pixels at a second column and the first row is one of the blue sub-pixels, and one of the driving TFTs corresponding to the one of the sub-pixels is at a left side of a second data line and electrically connected to the second data line and the first scan line; one of the sub-pixels at the second column and the second row is one of the white sub-pixels, and one of the driving TFTs corresponding to the one of the sub-pixels is at a right side of the first data line and electrically connected to the first data line and a second scan line; one of the sub-pixels at the second column and the third row is one of the red sub-pixels, and one of the driving TFTs corresponding to the one of the sub-pixels is at the left side of the second data and line electrically connected to the second data line and a fourth scan line; one of the sub-pixels at the second column and the fourth row is one of the white sub-pixels, and one of the driving TFTs corresponding to the one of the sub-pixels is at the right side of the first data line electrically connected to the first data line and the fourth scan line;

one of the sub-pixels at a third column and the first row is one of the red sub-pixels, and one of the driving TFTs corresponding to the one of the sub-pixels is at a right side of the second data line and electrically connected to the second data line and the second scan line; one of the sub-pixels at the third column and the second row is one of the green sub-pixels, and one of the driving TFTs corresponding to the one of the sub-pixels is at a left side of a third data line and electrically connected to the third data line and the second scan line; one of the sub-pixels at the third column and the third row is one of the blue sub-pixels, and one of the driving TFTs corresponding to the one of the sub-pixels is at the right side of the second data line and electrically connected to the second data line and the third scan line; one of the sub-pixels at the third column and the fourth row is one of the green sub-pixels, and one of the driving TFTs corresponding to the one of the sub-pixels is at the left side of the third data line and electrically connected to the third data line and the fourth scan line;

one of the sub-pixels at a fourth column and the first row is one of the white sub-pixels, and one of the driving TFTs corresponding to the one of the sub-pixels is at a right side of the third data line and electrically connected to the third data line and the first scan line; one of the sub-pixels at the fourth column and the second row is one of the blue sub-pixels, and one of the driving TFTs corresponding to the one of the sub-pixels is at the left side of the fourth data line and electrically connected to the fourth data line and the second scan line; one of the sub-pixels at the fourth column and the third row is a white sub-pixel, and one of the driving TFTs corresponding to the one of the sub-pixels is at the right side of the third data line and electrically connected to the third data line and the third scan line; one of the sub-pixels at the fourth column and the fourth row is one of the red sub-pixels, and one of the driving TFTs corresponding to the one of the sub-pixels is at a left side of the fourth data line and electrically connected to the fourth data line and the fifth scan line;

for a repetitive array unit at a right side of the fourth data line: one of the sub-pixels at a first column and a second row is one of the red sub-pixels, and one of the driving TFTs corresponding to the one of the sub-pixels is at the right side of the fourth data line and electrically connected to the fourth data line and the third scan line; one of the sub-pixels at the first column and a fourth row is one of the blue sub-pixels, and one of the driving TFTs corresponding to the one of the sub-pixels is at the right side of the fourth data line and electrically connected to the fourth data line and the fourth scan line.

6. The driver circuit structure for RGBW display panel as claimed in claim 5, wherein in each repetitive array unit:

ones of the driving TFTs that are electrically connected to a first data line and odd-numbered scan lines correspondingly control ones of the green sub-pixels at a left side of the first data line; ones of the driving TFTs that are electrically connected to the first data line and even-numbered scan lines correspondingly control ones of the white sub-pixels at a right side of the first data line;

ones of the driving TFTs that are electrically connected to a second data line and a first scan line correspondingly control ones of the blue sub-pixels at a left side of the second data line; ones of the driving TFTs that are electrically connected to the second data line and a third scan line correspondingly control ones of the blue sub-pixels at a right side of the second data line; ones of the driving TFTs that are electrically connected to the second data line and a second scan line correspondingly control ones of the red sub-pixels at the right side of the second data line; ones of the driving TFTs that are electrically connected to the second data line and a fourth scan line correspondingly control ones of the red sub-pixels at the left side of the second data line;

ones of the driving TFTs that are electrically connected to a third data line and odd-numbered scan lines correspondingly control ones of the white sub-pixels at a right side of the third data line; ones of the driving TFTs that are electrically connected to the third data line and even-numbered scan lines correspondingly control ones of the green sub-pixels at a left side of the third data line;

ones of the driving TFTs that are electrically connected to a fourth data line and the third scan line correspondingly control ones of the red sub-pixels at a right side of the fourth data line; ones of the driving TFTs that are electrically connected to the fourth data line and a fifth scan line correspondingly control ones of the red sub-pixels at a left side of the fourth data line; ones of the driving TFTs that are electrically connected to the fourth data line and the second scan line correspondingly control ones of the blue sub-pixels at the left side of the fourth data line; ones of the driving TFTs that are electrically connected to the fourth data line and a fourth scan line correspondingly control ones of the blue sub-pixels at the right side of the fourth data line.

* * * * *